(12) United States Patent
Zhuang

(10) Patent No.: US 12,376,567 B2
(45) Date of Patent: Aug. 5, 2025

(54) FUNCTIONAL ANIMAL CHEW

(71) Applicant: WENZHOU YUANFEI PET TOY PRODUCTS CO., LTD., Wenzhou (CN)

(72) Inventor: Mingyun Zhuang, Wenzhou (CN)

(73) Assignee: WENZHOU YUANFEI PET TOY PRODUCTS CO., LTD., Wenzhou (CN)

( * ) Notice: Subject to any disclaimer, the term of this patent is extended or adjusted under 35 U.S.C. 154(b) by 14 days.

(21) Appl. No.: 18/538,303

(22) Filed: Dec. 13, 2023

(65) Prior Publication Data
US 2025/0169472 A1 May 29, 2025

(30) Foreign Application Priority Data
Nov. 28, 2023 (CN) .......................... 202311616796.9

(51) Int. Cl.
*A01K 15/02* (2006.01)

(52) U.S. Cl.
CPC .................................. *A01K 15/026* (2013.01)

(58) Field of Classification Search
CPC .... A01K 15/026; A01K 15/025; A23K 50/40; A23K 50/20; A23K 10/26
See application file for complete search history.

(56) References Cited

U.S. PATENT DOCUMENTS

| | | | | |
|---|---|---|---|---|
| 5,673,653 | A * | 10/1997 | Sherrill | A01K 15/026 |
| | | | | 119/709 |
| 2004/0126462 | A1 * | 7/2004 | Tepper | A01K 15/026 |
| | | | | 426/89 |

FOREIGN PATENT DOCUMENTS

| | | | | |
|---|---|---|---|---|
| DE | 102020127654 A1 * | 4/2022 | | |
| KR | 20240150637 A * | 10/2024 | | |
| WO | WO-2021216646 A1 * | 10/2021 | ........... | A01K 15/025 |
| WO | WO-2021216650 A1 * | 10/2021 | ........... | A01K 15/026 |

\* cited by examiner

*Primary Examiner* — Trinh T Nguyen
(74) *Attorney, Agent, or Firm* — Westbridge IP LLC

(57) ABSTRACT

A functional animal chew includes chewing material, the chewing material having a first side surface and a second side surface opposite to it; pore array, the pore array consisting of evenly distributed pores that pass through the first side surface and the second side surface, with a pore density of 4 to 40 per square centimeter; and one or more functional ingredients, retained in the pores of the pore array. The chewing material includes natural rawhide and/or synthetic rawhide; the functional ingredient includes methylsulfonylmethane, with a mass percentage not exceeding 4% in the animal chew per 100 grams. The animal chew can supplement organic sulfur for domestic pets and address the technical issue of poor skin and hair health due to imbalanced intake of functional elements in domestic pets.

10 Claims, 4 Drawing Sheets

FUNCTIONAL ANIMAL CHEW

CROSS-REFERENCE TO RELATED APPLICATIONS

This application claims priority to Chinese Patent Application No. 202311616796.9, filed on Nov. 28, 2023, the content of which is incorporated herein by reference in its entirety.

TECHNICAL FIELD

The present application belongs to the field of pet food technology, specifically involving a functional animal chew.

BACKGROUND

Animal chews are commonly given to domestic pets, especially dogs, to satisfy their natural chewing needs. These chews not only provide entertainment for pets but can also serve as a source of nutrients depending on the materials used to make them. Rawhide, in particular, is widely popular for making animal chews because it allows pets to chew for a considerable amount of time. Additionally, the physical properties of the rawhide itself can be used to shape it into various forms, such as bone-shaped sticks.

Currently, much of the research on animal chews focuses on their additional benefits for improving the oral health of domestic pets. For example, the US patent publication U.S. Pat. No. 5,673,653A (filed by SHERRILL) published on Oct. 7, 1997 describes various types of coatings applied to rawhide chews. These coatings may contain additional additives to reduce pet oral odors, as well as to provide dental care for pets by removing or preventing plaque or other harmful accumulations from their teeth. Another example is the US patent publication U.S. Pat. No. 5,100,651A (filed by BOYER), published on Mar. 31, 1992, which describes health products for dog dental care composed of support materials made from animal skin. These support materials introduce or absorb various water-soluble active substances, which are selected from the following components of preservatives: sodium fluoride, monofluorophosphate, or mixtures thereof.

However, unlike the long history of research on animal chews for improving the oral health of domestic pets, there is less attention given to issues related to the skin and hair health of pets caused by an unbalanced intake of functional elements, such as smoothness, glossiness, and poor resilience. There are also a few related functional animal chews available on the market. Even if there are, they still face technical issues in addressing the skin and hair health problems caused by an unbalanced intake of functional elements.

Given these shortcomings, it is necessary to provide a functional animal chew.

SUMMARY

The main purpose of this application is to propose a functional animal chew, aiming to address the lack of attention to the issues related to the skin and hair health of domestic pets caused by an unbalanced intake of functional elements, as well as the scarcity of related functional animal chews in the market. Even if there are, they still face technical issues in addressing the skin and hair health problems caused by an unbalanced intake of functional elements.

To achieve the above purpose, this application proposes a functional animal chew, comprising:
chewing material, the chewing material has a first surface and a second surface opposite to the first surface;
a pore array, the pore array is composed of evenly distributed pores, which penetrate through the first and second surfaces of the chewing material. The pore density of the pore array is 4 to 40 per square centimeter; and
one or more functional ingredients, retained in the pores of the pore array;
where the chewing material includes natural rawhide material and/or synthetic rawhide material;
The functional ingredient includes methylsulfonylmethane, and the mass percentage of methylsulfonylmethane in the animal chew per 100 grams does not exceed 4%.

Furthermore, the mass percentage of methylsulfonylmethane in the animal chew per 100 grams does not exceed 2%.

Furthermore, the mass percentage of water in the animal chew is from 5% to 15%.

Furthermore, the chewing material includes partially hydrolyzed collagen, and the mass percentage of partially hydrolyzed collagen in the animal chew is from 30% to 50%.

Furthermore, the chewing material includes fat, and the mass percentage of fat in the animal chew does not exceed 10%.

Furthermore, the pore array is obtained by perforating the chewing material with a perforation mechanism.

Furthermore, the pores are roughly cylindrical through-holes.

Furthermore, the methylsulfonylmethane is maintained in a film form on the inner wall of the pores.

Furthermore, the methylsulfonylmethane fills the pores.

Furthermore, the mass percentage of methylsulfonylmethane in the animal chew per 100 grams is 2%.

DETAILED DESCRIPTION OF THE EMBODIMENTS

Figure 1:
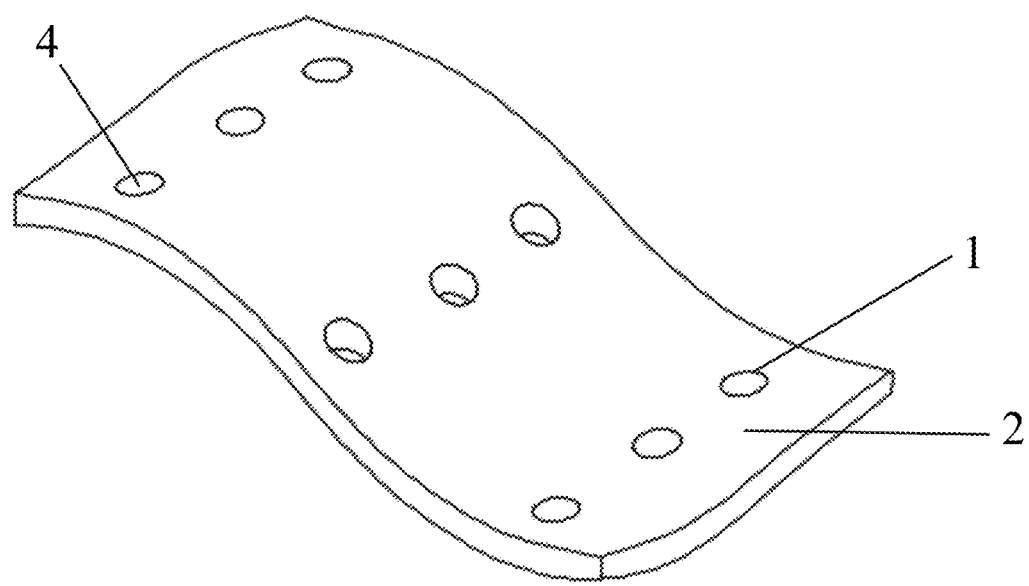
FIG. 1 shows a schematic diagram of a functional animal chew in an embodiment of the present application.
Figure 2:
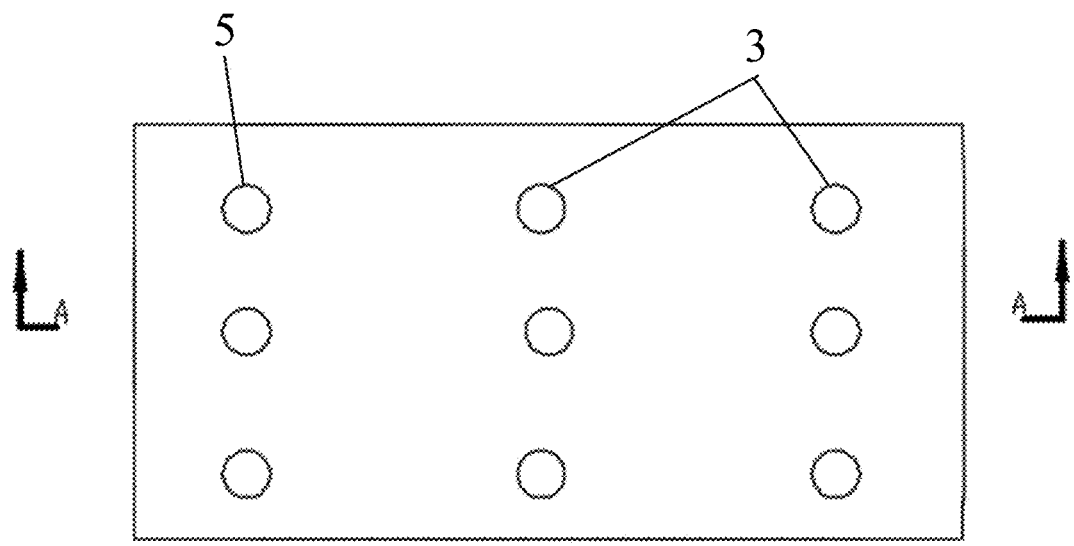
FIG. 2 shows a top view of a functional animal chew in an embodiment of the present application.
Figure 3:
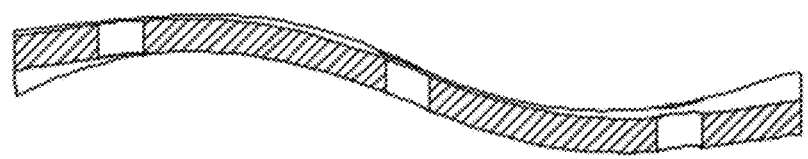
FIG. 3 shows a sectional view of FIG. 2 in the A-A direction.

The following further details various aspects of the present application.

Unless otherwise defined or explained, all technical and scientific terms used in this document have the same meaning as understood by those skilled in the art. Furthermore, any methods and materials similar or equivalent to those described can be used in the present application.

Unless specifically defined and limited, the term "or" in the present application includes the relationship of "and". The term "and" is equivalent to the Boolean logic operator "AND", and the term "or" is equivalent to the Boolean logic operator "OR", with "AND" being a subset of "OR".

It can be understood that although terms such as "first", "second", etc., may be used here to describe different elements, these elements should not be limited by these terms. These terms are only used to distinguish one element from another. Therefore, the first element can be referred to as the second element without departing from the teaching of the present disclosure.

In the present application, the terms "consisting essentially of" and "comprising" are encompassed by the terms "containing", "including", or "having".

Unless specifically defined and limited, the terms "connected", "communicating", and "coupled" in the present application should be broadly interpreted, for example, it can be a fixed connection, or it can be connected through an intermediary medium, it can be the internal connection of two elements or the interaction between the two elements. Those skilled in the art can understand the specific meanings of the above terms in this application according to specific situations.

For example, if a component (or part) is referred to as being on another component, coupled to another component, or connected to another component, the component can be formed, coupled, or connected directly to the other component, or there may be one or more intervening components between them. Conversely, if the phrases "directly on", "directly coupled to", and "directly connected to" are used, it means there are no intervening components. Other words used to describe the relationship between components should be similarly interpreted, such as "between" and "directly between", "attached" and "directly attached", "adjacent" and "directly adjacent", and so on.

Additionally, it should be noted that the terms "front", "back", "left", "right", "top", and "bottom" used in the following description refer to the directions in the drawings. The terms "inner" and "outer" respectively refer to the direction towards or away from the geometric center of a specific component. It can be understood that in this context, these terms are used to describe the relationship of a component, layer, or region shown in the drawings to another component, layer, or region. In addition to the orientations described in the drawings, these terms should also include other orientations of the device.

Other aspects of the present application are apparent to those skilled in the art from the disclosure herein.

To illustrate the specific embodiments of the present application or technical solutions in the prior art more clearly, the present application will be described in detail below concerning the accompanying drawings. The drawings provided in the following embodiments are only some embodiments of the present application, and ordinary technical users in the field can obtain other drawings and other embodiments based on these drawings without creative labor.

It should also be noted that the illustrations provided in the following embodiments are only intended to illustrate the basic concepts of the present disclosure schematically. The components shown in the figures are only related to the components in the present application, and are not drawn according to the actual number, shape, and size of the components in actual implementation. The shape, quantity, and proportion of each component in actual implementation may be arbitrarily changed, and the layout of the components may also be more complex. For example, the thickness of the components in the figures may be exaggerated for clarity.

Due to the lack of attention to the problem of poor skin and hair health in domestic pets caused by imbalanced intake of functional elements, there are few related functional animal chews on the market. Even if there are, they still face technical issues in inhibiting the poor skin and hair health of domestic pets due to imbalanced intake of functional elements.

As shown in FIGS. 1-7, to achieve the above purpose, the present application proposes a functional animal chew, including:

chewing material 2, which has a first side surface and a second side surface opposite to the first side surface;

a pore array 3, which is composed of evenly distributed pores 1, and the pores 1 pass through the first side surface and the second side surface. The pore density of the pore array 3 is 4 to 40 per square centimeter; and one or more functional ingredients 4, retained in the pores 1 of the pore array 3.

The chewing material 2 includes natural rawhide and/or synthetic rawhide; the functional ingredients 4 include methylsulfonylmethane, and the mass percentage of methylsulfonylmethane in the animal chew per 100 grams does not exceed 4%.

It should be noted that the animal chew is an edible one. The term "chew" has its common meaning in the field, referring to food for pets to gnaw or chew on. When pets gnaw or chew on the chew, it provides enough resistance to their teeth and gums, increasing their interest in chewing, exercising their teeth, and promoting gum circulation.

It should be noted that the term "methylsulfonylmethane" is an organic sulfide with good water solubility, and it can provide sulfur in the amino acids methionine and cysteine in organisms such as the human body.

The term "natural rawhide" refers to the skin obtained from animals, which are usually non-companion animals of humans, such as cows, sheep, pigs, deer, and marsupials. In one embodiment, to obtain suitable chewing material 2, methods known to those skilled in the art can be used to process fresh leather. For example, most visible fat and meat can be removed from fresh leather, and then the fresh rawhide can be treated in a solution of calcium carbonate or calcium hydroxide, which helps to remove animal hair. Additionally, sodium sulfide, ammonium salt, or enzymes can be added to the solution to further remove hair from the fresh rawhide, and the rawhide can be rinsed. Finally, the fresh rawhide can be soaked in a solution of organic acids, inorganic acids, and/or acid salts (such as potassium bitartrate and sodium bicarbonate), rinsed again, and formed into thin slices. The rawhide can then undergo dehydration by drying or pressing. The moisture content in the dried rawhide is preferably in the range of 2% to 18%, more preferably in the range of 5% to 15%.

In one example, the rawhide can be cut or ground into small particles or powder, with the particle size being less than about 5 mm, preferably less than about 3 mm, and even more preferably less than about 2 mm. The small particles or powder can also be subjected to melting processing and plastic extrusion to obtain rawhide with a suitable shape and uniform texture. To achieve the appropriate thickness of the rawhide, the rawhide can be layered and compressed, with the pressure range being about 10 MPa to 20 MPa, preferably 11 MPa to 19 MPa, and even more preferably 12 MPa to 18 MPa, 13 MPa to 17 MPa, 14 MPa to 16 MPa, or 15 MPa.

In one embodiment, the rawhide with the appropriate thickness can also undergo stretching treatment.

The term "synthetic rawhide" refers to modified starch, such as modified starch obtained from corn starch, high-viscosity potato starch, cassava starch, or a combination thereof. The synthetic rawhide can be processed to obtain chewing material 2.

As a preferred embodiment, the mass percentage of methylsulfonylmethane in the animal chew does not exceed 2% per 100 grams.

As a preferred embodiment, the mass percentage of water in the animal chew is 5% to 15%.

It should be noted that by controlling the mass percentage of water in the natural rawhide material and/or synthetic rawhide material, the animal chew can have suitable toughness and chewing characteristics. If the mass percentage of water in the natural rawhide material and/or synthetic rawhide material is too low, the animal chew will be excessively brittle and lack toughness, making it prone to breakage. If the mass percentage of water is too high, the chewing experience of the animal chew will be poor. Therefore, setting the mass percentage of water in the natural rawhide material and/or synthetic rawhide material to 5% to 15%, preferably 6% to 15%, 7% to 15%, 8% to 15%, 9% to 15%, 10% to 15%, or 11% to 15% is preferred.

As a preferred embodiment, the chewing material 2 includes partially hydrolyzed collagen, which accounts for 30% to 50% of the mass percentage in the animal chew.

It should be noted that the term "partially hydrolyzed collagen" refers to a product derived from collagen, in which the natural collagen is hydrolyzed by enzymes, resulting in hydrolyzed collagen, in which at least some of the collagen fibers have been separated. During partial hydrolysis, peptide chains may or may not be hydrolyzed and shortened. In one embodiment, the peptide chains may be minimally or not shortened during partial hydrolysis. The partially hydrolyzed collagen is preferably formed so that at least some of it is insoluble in water, and preferably at least some of it is soluble in water. The mass percentage of partially hydrolyzed collagen in the animal chew is beneficial for the absorption of household pets, as it can meet their intake requirements beyond a normal diet.

As a preferred embodiment, the chewing material 2 includes fat, which accounts for no more than 10% of the mass percentage in the animal chew.

As a preferred embodiment, the pore array 3 is obtained by perforating the chewing material 2 using a perforation mechanism.

It should be noted that the perforation mechanism is a unit in the animal chew processing system, which includes a bearing plate and a pressing plate. The pre-processed chewing material 2 is placed on the bearing plate, and the pressing plate moves up and down vertically to apply pressure and release to the chewing material 2. A perforation needle array is provided on the contact surface between the pressing plate and the chewing material 2, extending outwardly perpendicular to the pressing plate. The perforation needles have approximately the same diameter. For easier perforation of the chewing material 2, the bearing plate is preferably provided with a corresponding pore array 3 to protect the perforation needle array from damage due to external forces during perforation.

As a preferred embodiment, the pores 1 are roughly cylindrical through-holes 5.

It should be noted that by setting the pore as a roughly cylindrical through-hole 5, it can meet the loading requirements of methylsulfonylmethane in the animal chew, and at the same time, it can provide better deformation characteristics for the chewing material 2.

As a preferred embodiment, the methylsulfonylmethane is maintained in a thin film form on the inner wall of the pore 1.

As a preferred embodiment, the pore 1 is filled with methylsulfonylmethane.

It should be noted that due to its good water solubility and easy crystallization characteristics, methylsulfonylmethane can be maintained in a thin film form on the inner wall of the pore 1, or filled in the pore 1; specifically, the purpose of setting methylsulfonylmethane on the inner wall of the pore 1 or filling it in the pore 1 can be achieved through injection, spraying, or soaking.

It should be noted that whether maintaining methylsulfonylmethane in a thin film form on the inner wall of pore 1 or filling pore 1 with methylsulfonylmethane is beneficial for the digestion and absorption of methylsulfonylmethane by household pets. The reason is that the teeth of household pets can more easily tear apart functional animal chews by acting on the pore array 3 set in the chewing material 2, even tearing them into particle-like fragments. In other words, compared with chewing materials 2 without a pore array 3, the setting disclosed herein is more easily chewable, making methylsulfonylmethane more easily ingested and digested by household pets, thereby exerting its function.

EMBODIMENT

Eighteen golden retrievers were selected, including nine male golden retrievers and nine female golden retrievers, aged 8 to 9 months and weighing 24 kg to 29 kg. The golden retrievers were divided into three groups, A, B, and C, each consisting of three male golden retrievers and three female golden retrievers. For the 30 days before the study, it was ensured that the three groups of golden retrievers did not ingest any drugs that could cause changes in their intestinal flora; five days before the study, the three groups of golden retrievers were vaccinated and dewormed to ensure that all golden retrievers were healthy and in similar health conditions. During the study, each dog in each group was isolated in a separate cage, and the environmental temperature was kept at room temperature, with humidity controlled at about 65%. The study lasted for 60 days.

Prepare the same main meal food and entertainment animal chews for the three groups of golden retrievers. The intake of the main meal food is adjusted proportionally according to the weight of each golden retriever, while the animal chews are divided into three groups. Except for the different content of methylsulfonylmethane, the amounts of the chews in each group are kept the same. In terms of methylsulfonylmethane content, Group A is the blank control group, with a 0% mass ratio of methylsulfonylmethane in 100 grams of animal chews provided to each golden retriever in Group A. Group B is the low-dose group, with a 2% mass ratio of methylsulfonylmethane in 100 grams of animal chews provided to each golden retriever in Group B. Group C is the high-dose group, with a 4% mass ratio of methylsulfonylmethane in 100 grams of animal chews provided to each golden retriever in Group C. It's important to note that the main meal food does not contain methylsulfonylmethane (meaning all golden retrievers can only ingest methylsulfonylmethane through the animal chews). Throughout the study, efforts should be made to ensure that each golden retriever in Group B ingests a similar amount of methylsulfonylmethane daily, and the same applies to Group C.

On day 0 and day 60, hair samples were collected from each golden retriever in Groups A, B, and C to measure the hair cuticle scales structure, sulfur content, and sulfur-containing amino acid content in each sample. It's worth noting that sulfur-containing amino acids are essential for hair growth and include cysteine, dicysteine, and methionine. Methionine can be converted into cysteine and dicysteine, and cysteine and dicysteine can be interconverted, making methionine an essential amino acid. The sulfur-containing amino acid content is crucial for the shine, elasticity, and strength of the hair, while the smoothness of the hair cuticle scales structure reflects the shine and health of the hair.

The hair cuticle scales structure (including hair diameter, thickness, and height of the cuticle scales) was measured using a scanning electron microscope (Axia ChemiSEM, Thermo Fisher); the sulfur-containing amino acid and keratin content were measured using an X-ray energy spectrometer (Thermo Scientific™ UltraDry EDS, Thermo Fisher).

Table 1 shows the sulfur content and percentage of sulfur-containing amino acids in the hair samples of the three groups of golden retrievers on day 0 and day 60. The percentage values of the test data are the average values of the corresponding data of six golden retrievers in Groups A, B, and C.

TABLE 1

Sulfur content and percentage of sulfur-containing amino acids in the hair samples of the three groups of golden retrievers on day 0 and day 60

| Detection time | Group A (blank control group) | Group B (low-dose group) | Group C (high-dose group) |
|---|---|---|---|
| Day 0 | | | |
| Methionine | 1.25 | 1.23 | 1.06 |
| Cysteine | 7.18 | 7.21 | 6.62 |
| Sulfur | 13.97 | 11.13 | 12.43 |
| Day 60 | | | |
| Methionine | 1.51 | 1.37 | 1.42 |
| Cysteine | 5.12 | 4.82 | 3.62 |
| Sulfur | 11.73 | 13.40 | 13.17 |

It can be seen that compared to the sulfur content in the hair samples of the three groups of golden retrievers on day 0, the sulfur content in the hair samples of Group A (blank control group) on day 60 decreased, indicating that the golden retrievers in Group A did not receive organic sulfur supplementation. On the other hand, the sulfur content in the hair samples of Group B (low-dose group) and Group C (high-dose group) increased on day 60 compared to day 0. Additionally, the increase in sulfur content in the hair samples of Group B (low-dose group) from day 0 to day 60 was greater than that of Group C (high-dose group).

Furthermore, compared to the total content of methionine and cysteine in the hair samples of the three groups of golden retrievers on day 0, the total content of methionine and cysteine in the hair samples of Group A (blank control group), Group B (low-dose group), and Group C (high-dose group) decreased on day 60. However, the decrease in the total content of methionine and cysteine in the hair samples of Group C (high-dose group) was greater than that of Group B (low-dose group).

In particular, considering that the organic sulfur ingested by the golden retrievers in Group B (low-dose group) and Group C (high-dose group) would supply methionine and cysteine, it appears to be more advantageous for Group B (low-dose group).

Figure 4:
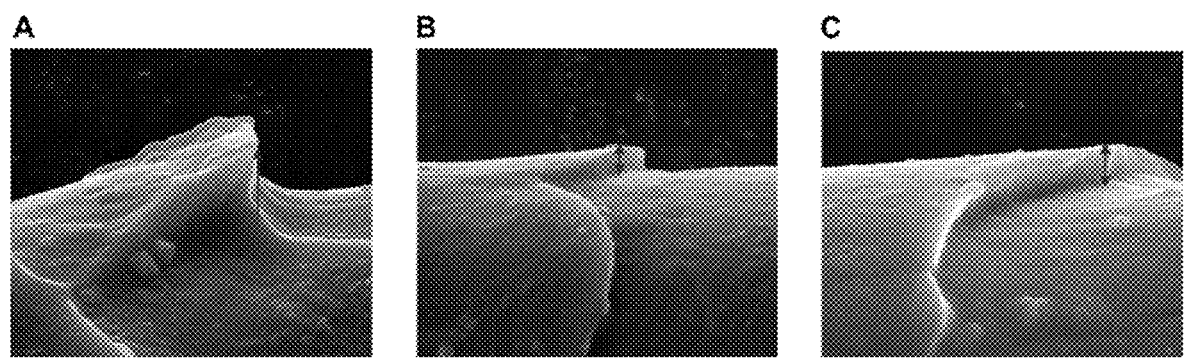
FIG. 4 shows the hair cuticle scales thickness in the hair samples of golden retrievers in Groups A (blank control group), B (low-dose group), and C (high-dose group) on the 60th day in an embodiment of the present application.

As shown in FIG. 4, the A graph in FIG. 1 represents the thickness of the hair cuticle scales in the hair samples of Group A (blank control group) on day 60, the B graph represents the thickness of the hair cuticle scales in the hair samples of Group B (low-dose group) on day 60, and the C graph represents the thickness of the hair cuticle scales in the hair samples of Group C (high-dose group) on day 60. The hair cuticle scales in the hair samples of Group B (low-dose group) on day 60 are the thinnest.

Figure 5:
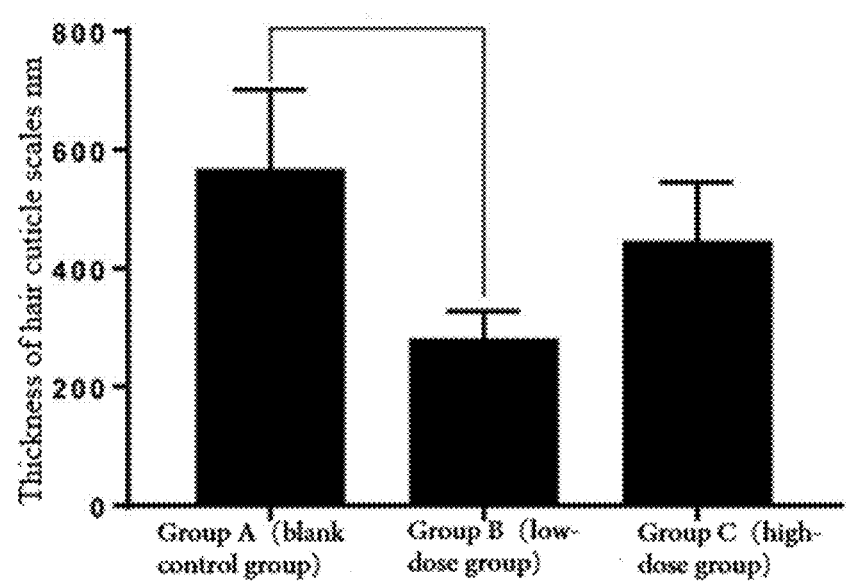
FIG. 5 shows the hair cuticle scales thickness data in the hair samples of golden retrievers in Groups A (blank control group), B (low-dose group), and C (high-dose group) on the 60th day in an embodiment of the present application.

As shown in FIG. 5, the data quantitatively illustrates the thickness of the hair cuticle scales in the hair samples of Group A (blank control group), Group B (low-dose group), and Group C (high-dose group) on day 60. The hair cuticle scales in the hair samples of Group A (blank control group) have the largest thickness, while the hair cuticle scales in the hair samples of Group B (low-dose group) on day 60 have the smallest thickness.

Figure 6:
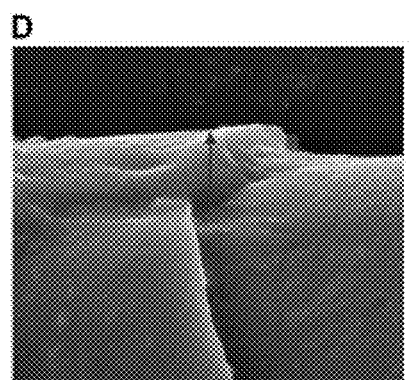
FIG. 6 shows the hair cuticle scales thickness in the hair samples of golden retrievers in Group B (low-dose group) on the 0th day in an embodiment of the present application.
Figure 7:
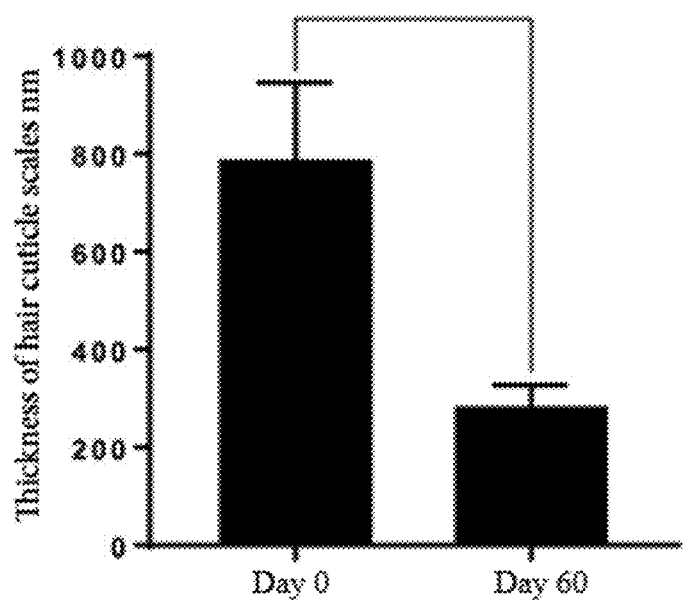
FIG. 7 shows the hair cuticle scales thickness data in the hair samples of golden retrievers in Group B (low-dose group) on the 0th day and the 60th day in an embodiment of the present application.

FIG. 6 shows the thickness of the hair cuticle scales in the hair samples of Group B (low-dose group) on day 0, and FIG. 7 shows the thickness of the hair cuticle scales in the hair samples of Group B (low-dose group) on day 0 and day 60.

Based on the above, it can be concluded that the Group B (low-dose group) has the best effect on the repair of the hair in golden retrievers.

Based on this application, those skilled in the field should understand that one aspect described in this document can be independently implemented from any other aspect, and these aspects can be combined in various ways. For example, any number and aspect described in this document can be used to implement the device and/or practice the method. Additionally, structures and/or functionalities other than those described in this document can be used to implement the device and/or practice the method.

It should be noted that the above embodiments can be freely combined as needed. The above description is only the preferred embodiment of the present application. It should be pointed out that for ordinary skilled artisans in the technical field, improvements and refinements can be made without departing from the principles of the present application, and these improvements and refinements should also be considered within the scope of the present application.

All the documents mentioned in the present application are cited in this application as references, just as each document is cited individually as a reference. Furthermore, it should be understood that after reading the above content of the present application, technical users in this field can make various changes or modifications to the present application, and these equivalent forms also fall within the scope defined by the claims attached to this application.

What is claimed is:
1. A functional animal chew, comprising:
   chewing material having a first side surface and a second side surface;
   a pore array composed of uniformly distributed pores traversing the first side surface and the second side surface, with a pore density of 4 to 40 per square centimeter; and one or more functional ingredients retained in the pores of the pore array; wherein the chewing material comprises natural rawhide material, or synthetic rawhide material, or a combination of natural rawhide material and synthetic rawhide material; and the functional ingredients comprise less than 4% by mass of methylsulfonylmethane per 100 grams of the animal chew.

2. The functional animal chew according to claim 1, wherein a mass percentage of methylsulfonylmethane does not exceed 2% per 100 grams of the animal chew.

3. The functional animal chew according to claim 2, wherein water accounts for 5% to 15% of the mass of the animal chew.

4. The functional animal chew according to claim 3, wherein the chewing material includes partially hydrolyzed collagen, with a mass percentage of 30% to 50% in the animal chew.

5. The functional animal chew according to claim 4, wherein the chewing material includes fat, with a mass percentage not exceeding 10% in the animal chew.

6. The functional animal chew according to claim 5, wherein the pores are roughly cylindrical through-holes.

7. The functional animal chew according to claim 6, wherein the pore array is obtained by perforating the chewing material with a perforating mechanism.

8. The functional animal chew according to claim 7, wherein the methylsulfonylmethane is maintained in a film form on an inner wall of the pores.

9. The functional animal chew according to claim 7, wherein the methylsulfonylmethane fills the pores.

10. The functional animal chew according to claim 7, wherein a mass percentage of methylsulfonylmethane in every 100 grams of the animal chew does not exceed 2%.

* * * * *